July 4, 1933.  F. S. KINGSTON  1,916,270

INDUCTION MOTOR

Filed Feb. 27, 1930

INVENTOR
F. S. KINGSTON.

BY

ATTORNEYS.

Patented July 4, 1933

1,916,270

UNITED STATES PATENT OFFICE

FREDERICK S. KINGSTON, OF WARREN, OHIO, ASSIGNOR, BY MESNE ASSIGNMENTS, TO THE OAKWOOD ELECTRICAL MANUFACTURING COMPANY, A CORPORATION OF OHIO

INDUCTION MOTOR

Application filed February 27, 1930. Serial No. 431,750.

The present invention relates to an improvement in electric motors, and the improvement is of especial value and utility in connection with an alternating current motor in which an electro-magnet or a resistance winding or the like is used. For example, reference may be had to the single-phase induction motor disclosed in my Letters Patent of the United States, No. 1,665,742, dated April 10, 1928, in which a friction clutch operates normally to connect the rotor with the motor shaft, and the clutch is dis-engaged or rendered inactive by an electromagnet the instant the electric current is switched on to start the motor. A speed-responsive switch is also employed to cut off the starting winding and the electro-magnet winding when the rotor reaches a predetermined speed, thus permitting the motor to run on the main field winding with or without another winding in the same circuit. In the modified form of circuits shown in the patent where the electro-magnet winding or a part thereof is connected in series with the main field winding, no provision was made for short-circuiting the magnet winding or part thereof, so that the motor operated or continued to run normally with both the main field winding and the electro-magnet winding or a part thereof energized.

In general, the object of this improvement is to reduce the inrush of current in starting operations to a still lower value than in the said patented motor and to obtain other improved performance characteristics by connecting the electro-magnet coil in series with the main field winding and providing means for short-circuiting said coil when the motor comes up to speed. In that way the motor may be caused to run on the main field winding only and the magnet winding may be suitably constructed to meet predetermined requirements and used as a series inductance to keep down the starting current very materially and to aid in obtaining the best phase splitting results and a higher starting efficiency, all as hereinafter more fully described and more concisely set forth in the claims.

Figure 1:
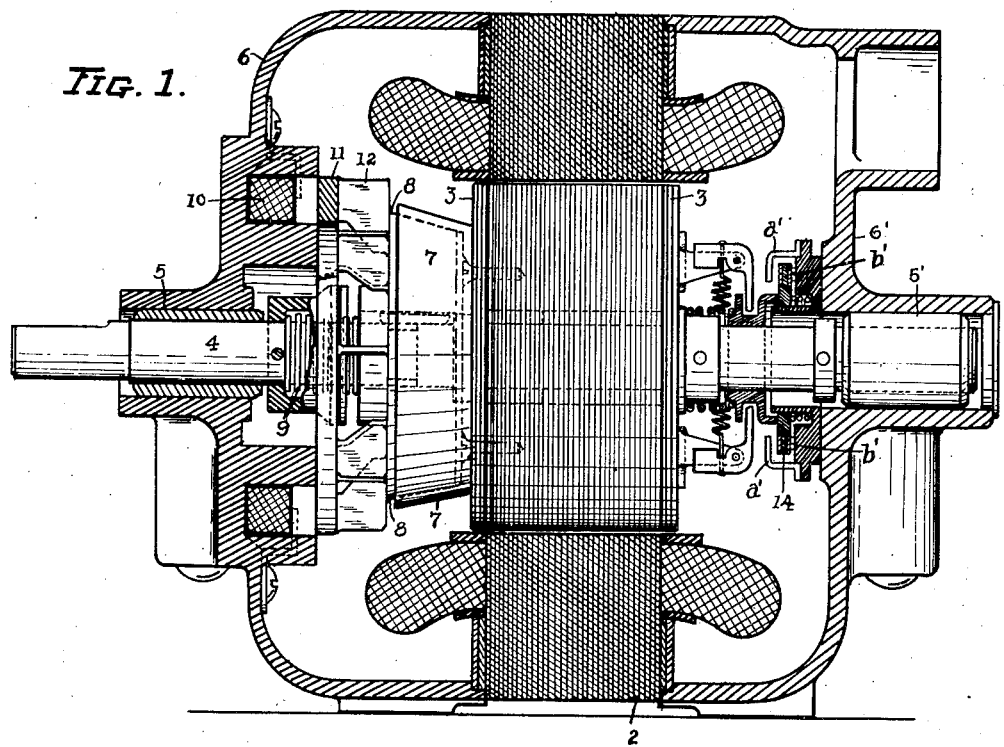
Figure 2:
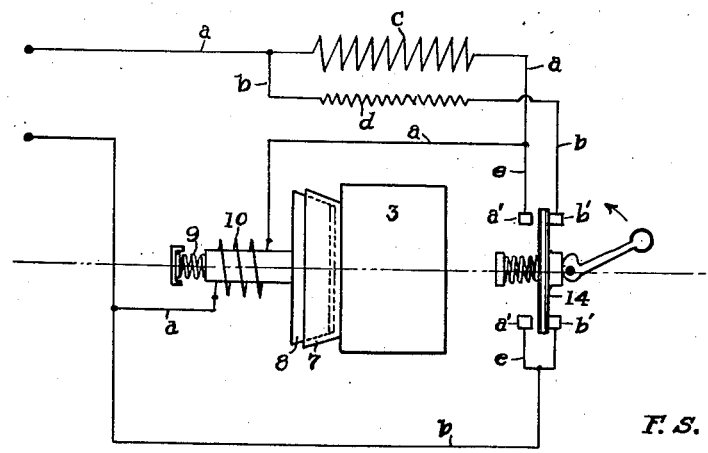

Referring first to the accompanying drawing, Fig. 1 is a sectional view of an electric motor which includes an electro-magnet and other devices constructed and arranged to operate according to my invention, and Fig. 2 in an electrical diagram of a motor circuit embodying the invention.

The motor structure shown in the drawing merely exemplifies one form or kind in which the invention may be incorporated. Briefly described, this structure comprises a laminated stator body 2 and an armature or rotor 3 mounted to revolve freely on a driving shaft 4 supported in suitable bearings 5—5' forming part of the end hoods 6—6' fixed to stator 2. However, the rotor is normally connected in driving relation with the shaft by a friction clutch composed of a clutch member 7 attached to the rotor, and a second clutch member 8 slidably keyed to shaft 4 and pressed against the first clutch member 7 by a spring 9. The clutch members may be disengaged to permit rotor 3 to revolve freely on the shaft by energizing an electro-magnet coil or winding 10 within hood 6, the armature 11 of the electro-magnet being connected by fan blades 12 to the movable clutch member 8. One or more speed responsive devices are also connected to the rotor to control two circuits $a$ and $b$ respectively, connected in parallel across the line or source of electric supply for the motor. Preferably a single double-acting centrifugal switch 14 is employed to break or switch off one circuit and make or close the second circuit.

Thus referring to Fig. 2, the motor shown includes a main circuit $a$ connected across the line which contains a main field winding $c$ and a clutch magnet coil 10, in series relation. An auxiliary or starting winding $d$ for the motor is also connected across the line in circuit $b$, which circuit is adapted to be opened and closed by the speed-responsive switch 14 when the rotor attains a predetermined speed. Switch 14 includes two sets of contacts, one set consisting of a pair of contacts $a$—$a'$ in a shunt or short circuit $e$, and the other set consisting of a pair of contacts $b'$—$b'$ in circuit $b$. When the motor is at rest or just starting the centrifugal switch 14 provides a closed path for the electric current over circuit $b$, and short circuit $e$ is open inasmuch as contacts $a'$—$a'$ are not engaged or connected at this time by the movable disk or switch member 14. Accordingly, the main field winding $c$ and the magnet coil 10 are connected in series across the line and starting winding $d$ is also connected directly across the line so that when electric current is supplied to the motor all three windings $c$, $d$, and 10 will be energized, thereby disengaging the clutch and permitting the rotor to revolve freely without load on the shaft. These connections and working conditions are maintained until the rotor reaches the desired speed, whereupon centrifugal switch 14 is actuated and the connections automatically changed to break circuit $b$ between contacts $b'$—$b'$ and to make or close short circuit $e$ between contacts $a'$—$a'$. As a result the starting winding $d$ is cut out or switched off, and the clutch coil 10 is short circuited or shunted out, leaving only the main winding $c$ in circuit directly across the line.

One great advantage of the circuit arrangement described is that it allows the clutch magnet to be used for a double purpose, both having great value. Thus at starting the main winding $c$ of the motor and the clutch magnet winding 10 are in series, so that the clutch magnet acts as an impedance in series with the main winding and aids in keeping the current in the main winding at the desired low value. In addition, winding 10 also functions when energized to actuate the clutch, that is, to disengage the clutch members during the starting period, and allowing them to engage when winding 10 is shunted out and de-energized at the end of the starting period.

The clutch magnet is an impedance made up of inductive reactance and effective resistance, the latter being due to the ohmic resistance of the wire and the iron loss in the magnetic circuit, the iron loss being relatively large when the clutch magnet core is not made of laminated material. Accordingly, the inductance of the clutch magnet is an aid in obtaining the required time-phase displacement between the currents in the main and starting windings. Also the magnet must of necessity be highly inductive in order to function properly as an electromagnet, and it is desirable to make the main winding circuit as highly inductive as possible relative to the starting winding circuit, so as to obtain the best practicable time phase angle between the currents in the main and starting windings.

On the other hand the addition of the clutch magnet in series with the main winding at starting does not mean that the phase splitting will necessarily be better than that of the same motor connected as an ordinary split phase motor. However, with the new circuit arrangement, better phase splitting was obtained than in clutch motors with a known circuit arrangement in which the main and starting windings were both connected directly across the line at starting. This improvement is due to the fact that the circuit arrangement described herein allows changes in the starting winding which were not permissible with the known circuit arrangement, and if no greater time-phase displacement between main and starting currents is effected it may have less and still be satisfactory, and might even be designed to have more. Whatever this relation may be, the fact still remains that the clutch magnet winding is inductive, and that its inductance is of great aid in obtaining the desired time-phase displacement between main and starting currents.

In designing a magnetic clutch motor with the circuit arrangement described, it is necessary to have sufficient ampere turns in the clutch magnet winding to give sufficient magnetic pull to properly operate the clutch so that it will be disengaged at starting, not only on normal line voltage but on a reasonable value of voltage lower than normal, and at the same time keep down the starting current to the desired value. Starting with a given stator, rotor and clutch magnetic circuit, the ampere-turns (and corresponding magnetic pull) increase as the clutch magnet turns increase up to a certain maximum value, after which any further increase in turns results in a decrease in magnet ampere-turns. With a given stator, rotor and clutch magnetic circuit, the constants may be determined and the number of turns in the clutch magnet required to give maximum ampere-turns readily calculated. In motors which have been made, approximately the maximum obtainable ampere-turns in the clutch magnet for the best performance and the value used was obtained by calculation. However, it is not a necessary feature of the motor that the maximum obtainable ampere-turns be used in the clutch magnet. It is believed that in most cases the designer will find it desirable to calculate and use a clutch magnet winding having close to the maximum obtainable ampere-turns, but seldom exactly the maximum. This is a matter of design, and cases might arise where less than the maximum is preferable.

The automatic switch 14 used in this motor was designed to change the connection from starting to running position at a relatively high speed and to change from running to starting connections at a much lower speed, and a time-lag in operations is desirable for the proper performance of the motor. A suitable automatic switch for the purpose is shown and described in a co-pending application Serial No. 445,667, filed April 19, 1930.

Good results were obtained when this switch operated at 1600 R. P. M. as the motor was accelerated from starting and at 600 R. P. M. when the motor slowed down after being stopped. As an alternative a device such as a dashpot or its equivalent may be used to slow down the action of the clutch when it is changing from the engaged to the disengaged position or vice versa, as exemplified in my application Serial No. 380,873, filed July 25, 1929. In that case a difference in speed between the opening and closing of the switch would not be a necessity. But it is preferred to use a switch that opens and closes at different speeds, as a dashpot is not then necessary and the performance more satisfactory and dependable. No set speed difference for the opening and closing of the switch has been found necessary, but only that there should be a considerable difference. A fractional horse-power motor properly designed and embodying the invention aforesaid has a locked rotor current (not locked shaft current) below 20 amperes and a starting current on a well damped ammeter of 12 to 15 amperes, which is a decided improvement and step in advance in this art and long sought for but not heretofore attained insofar as I am aware.

The specific means for actuating the clutch and modifications thereof are claimed in Patents Nos. 1,853,864 and 1,853,865 that issued April 12, 1932 and that were copending herewith, and the specific armature structure for the clutch unit is set forth and claimed in my co-pending application Serial No. 603,809 that was filed April 7, 1932.

What I claim is:

1. An induction motor, comprising a main field winding and an electro-magnet winding connected in series relation to a source of alternating current, an auxiliary starting winding connected to the same source of current, normally-engaged clutch members adapted to be released by the energization of said electro-magnet winding, and automatic switching means responsive to the speed of the motor arranged to cut out said starting winding and to short-circuit said electro-magnet winding when the motor is up to speed.

2. In an induction motor, a main field winding and an auxiliary starting winding, an electro-magnet having a winding connection in series relations with said main field winding and constructed to substantially reduce the inrush of current and to aid time-phase displacement of current in starting the motor, normally-engaged power-transmitting clutch members adapted to be disconnected by said electro-magnet to permit starting to be effected without load, and means responsive to the motor speed for open-circuiting said starting winding and short-circuiting said magnet winding automatically when a predetermined speed is obtained.

3. In an induction motor, a main field winding, an auxiliary starting winding, an electro-magnet having a winding, said winding being in series with said main field winding, a freely revoluble rotor, normally-engaged clutch members for said rotor adapted to be disengaged by said electro-magnet when its winding is energized, and a double-acting switch responsive to the speed of the motor for open-circuiting said starting winding and short-circuiting said electro-magnet winding when the motor is started and reaches a predetermined speed.

4. In a split phase induction motor, in combination, a main field winding and an inductive electromagnetic clutch winding connected in series across the power lines, a field starting winding connected across said power lines in parallel with said main field winding and inductive clutch winding, a centrifugal switch arranged, when the rotor is not yet up to speed, to put said starting winding in circuit and, when the rotor is up to speed, to cut said starting winding out of circuit and to short-circuit said clutch winding, whereby the current passing through said main field winding may pass directly back to the power lines without traversing the clutch windings.

In testimony whereof I hereby affix my signature.

FREDERICK S. KINGSTON.